C. M. BILLINGS.
CRANK SHAFT CONSTRUCTION.
APPLICATION FILED JUNE 25, 1921.
1,412,604. Patented Apr. 11, 1922.
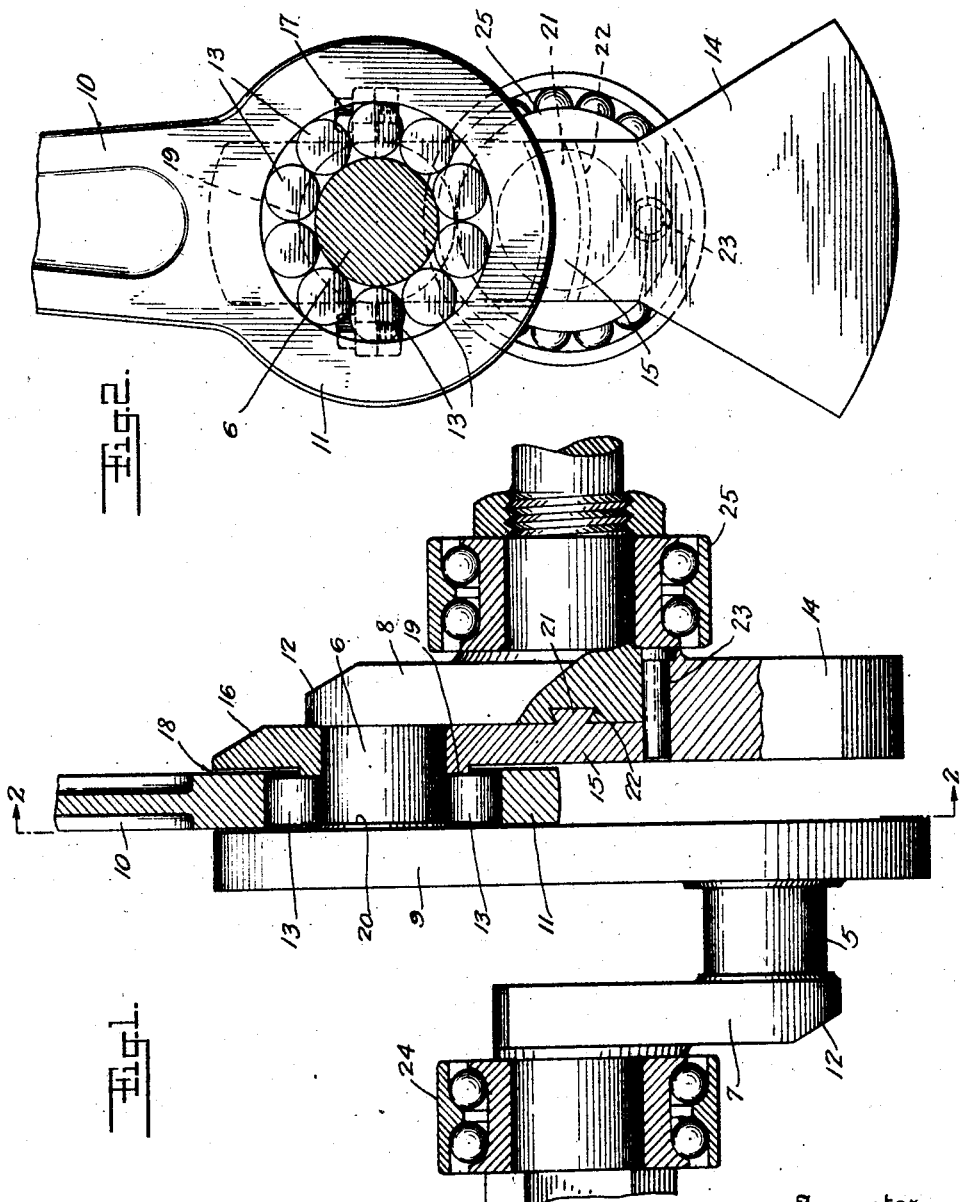
Inventor
C. M. Billings
By his Attorney
E. W. Marshall

UNITED STATES PATENT OFFICE.

CECIL M. BILLINGS, OF BROOKLYN, NEW YORK, ASSIGNOR TO DELMORE MANUFACTURING CO., INC., OF NEW YORK, N. Y., A CORPORATION OF NEW YORK.

CRANK-SHAFT CONSTRUCTION.

1,412,604.   Specification of Letters Patent.   Patented Apr. 11, 1922.

Application filed June 25, 1921. Serial No. 480,473.

*To all whom it may concern:*

Be it known that I, CECIL M. BILLINGS, a citizen of the United States, and a resident of Brooklyn, Kings County, and State of New York, have invented certain new and useful Improvements in Crank-Shaft Constructions, of which the following is a specification.

My present invention relates to crank shafts of the type used in internal combustion engines, and the objects of the invention are to combine in a simple practical manner the advantages of both a counterbalanced construction and a "solid," as opposed to a split or two-part connecting rod.

These objects I have attained by means of certain novel features of construction, combination and relation of parts, a typical example of which is illustrated in the accompanying drawing, wherein—

Figure 1 is a part sectional broken view illustrating an adaptation of the invention to a double-throw crank shaft.

Figure 2 is a cross sectional view on substantially the plane of line 2—2 of Figure 1.

In the double-throw crank shaft shown, the two crank pins 5 and 6 are located at diametrically opposite sides of the shaft between end cheeks 7 and 8 and an intermediate connecting web or cheek 9.

The connecting rods, one of which is shown at 10, are formed each with a solid or continuous eye or ring 11 for the cooperating crank pin and this eye is of sufficient size to enable the connecting rod being "threaded" endwise over the crank shaft into position about the crank pin. To facilitate this threading operation, the outer corners of the cheeks may be cut away, as indicated at 12.

A bearing engagement between the connecting rod and crank pin is effected in the illustration by interposing a series of rollers 13 between the periphery of the crank pin and the inner surface of the connecting rod eye, after the connecting rod has been brought to proper position over the crank pin. These rollers provide an effective anti-friction bearing and also operate as a simple means of taking up the space between these parts.

The connecting rod and the bearing rollers are held in properly assembled relation on the crank shaft by the counterbalance, which has a weighted portion 14 projecting to the opposite sides of the shaft from the crank pin and a filler portion 15 disposed at the inside of the cheek and of a thickness to fill up the space between the face of the cheek and the adjacent portions of the connecting rod and bearing rollers.

This spacing or filler portion of the counterweight is shown as having a removable cap 16, enabling its engagement over the crank pin and secured in place by suitable means such as the bolts 17 (Figure 2). In the construction illustrated a slight clearance is indicated at 18 between the adjacent faces of the filler and the connecting rod and the filler is shown as having an extended annular shoulder 19 operating as an end bearing to hold the rollers engaged at their opposite ends with a corresponding end shoulder 20.

The counterweight is preferably secured to the crank shaft in such a way as to effectively overcome the action of centrifugal force and this I have accomplished in the illustration by providing a rib 21 on the inner face of the filler portion, fitting in a corresponding groove 22 in the adjacent face of the crank shaft cheek. This tongue and groove may be of under-cut or dovetail construction, as shown, so as to the more effectively interlock these parts and this connection is preferably made at a point intersecting the center of the crank shaft.

To enable the engagement of the interlocking parts described, the rib 21 and the slot provided therefor are preferably formed on an arc, as shown in Figure 2, whose center corresponds to the center of the crank pin so that after the counterbalance is engaged on the crank pin, it can then be turned rotatively to interlock the rib 21 in the groove provided therefor. When the parts are so interlocked they may then be secured as by means of a pin shown at 23 as driven into complemental recesses provided in the body of the counterweight and the crank shaft respectively. The crank shaft bearings 24, 25 may be of the ball bearing type, as shown, or any other enabling this method of engaging and interlocking the parts.

The interlocked rib and groove on the counter-weight and crank shaft serve to take the load off the cap or removable section 16 of the counterweight and the under-cut construction of these parts prevents the body of the counterweight from shifting longitudinally.

What I claim is:

1. In combination, a crank shaft having a crank pin, a connecting rod engaged with said crank pin and a counterweight for the crank pin having a spacing portion for holding the connecting rod properly engaged on the crank pin.

2. In combination, a crank shaft having a crank pin, a connecting rod engaged with said crank pin and a counterweight for the crank pin having a spacing portion for holding the connecting rod properly engaged on the crank pin, said counterweight and crank shaft having interlocking parts.

3. In combination, a crank shaft having a crank pin, a connecting rod engaged with said crank pin and a counterweight for the crank pin having a spacing portion for holding the connecting rod properly engaged on the crank pin, said counterweight and crank shaft having interlocking parts formed on an arc drawn from the crank pin as a center.

4. In combination, a crank shaft having a crank pin, a connecting rod engaged with said crank pin, a counterweight for the crank pin having a spacing portion for holding the connecting rod properly engaged on the crank pin, said counterweight and crank shaft having interlocking parts formed on an arc drawn from the crank pin as a center and means for securing said parts against relative arcuate movement.

5. In combination, a crank shaft having a crank pin, a connecting rod engaged with said crank pin, and a counterweight for the crank pin having a spacing portion for holding the connecting rod properly engaged on the crank pin, said counterweight and crank shaft having interlocking parts, including interfitting undercut rib and groove elements.

6. In combination, a crank shaft having a crank pin, a connecting rod having a solid eye portion engageable endwise over the shaft onto said crank pin, bearing elements inserted within said eye portion and engaging the crank pin and a spacing member engaged about the crank pin at one side of the connecting rod and bearing devices to prevent removal of the same from the crank pin, said spacing member having a weighted portion extending to the opposite side of the crank shaft from the crank pin aforesaid.

7. In combination, a crank shaft having a crank pin, a connecting rod having a solid eye portion engageable endwise over the shaft onto said crank pin, bearing elements inserted within said eye portion and engaging the crank pin and a spacing member engaged about the crank pin at one side of the connecting rod and bearing devices to prevent removal of the same from the crank pin, said spacing member having a weighted portion extending to the opposite side of the crank shaft from the crank pin aforesaid and said spacing member having a removable cap portion to enable engagement of the same about the crank pin.

8. In combination, a crank shaft having a crank pin, a connecting rod having a solid eye portion engageable endwise over the shaft onto said crank pin, bearing elements inserted within said eye portion and engaging the crank pin and a spacing member engaged about the crank pin at one side of the connecting rod and bearing devices to prevent removal of the same from the crank pin, said spacing member having a weighted portion extending to the opposite side of the crank shaft from the removable cap portion to enable engagement of the same about the crank pin and interlocking elements on the counterweight member and crank shaft to relieve the cap of centrifugal force exerted by the counterweight.

9. In a construction of the character described, a crank shaft having a crank pin between crank cheeks, a connecting rod having a continuous eye portion adapted to be threaded endwise over the shaft onto the crank pin into position between said cheeks, bearing rollers engageable in said eye portion about the crank pin and a counterbalance interlocked with one of the cheeks and having a filler portion extending between said cheek and the adjacent face of the connecting rod.

10. In a construction of the character described, a crank shaft having a crank pin between crank cheeks, a connecting rod having a continuous eye portion adapted to be threaded endwise over the shaft onto the crank pin into position between said cheeks, bearing rollers engageable in said eye portion about the crank pin and a counterbalance interlocked with one of the cheeks and having a filler portion extending between said cheek and the adjacent face of the connecting rod, said filler portion having an annular portion forming an end bearing for the rollers aforesaid.

11. In a construction of the character described, a crank shaft having a crank pin between crank cheeks, a connecting rod having a continuous eye portion adapted to be threaded endwise over the shaft onto the crank pin into position between said cheeks, bearing rollers engageable in said eye portion about the crank pin and a counterbalance interlocked with one of the cheeks and having a filler portion extending between said cheek and the adjacent face of the connecting rod, said filler portion having a removable cap section to enable the engagement with the crank pin.

In witness whereof, I have hereunto set my hand this 21st day of June, 1921.

CECIL M. BILLINGS.